(12) United States Patent
Barthold

(10) Patent No.: US 6,714,427 B1
(45) Date of Patent: Mar. 30, 2004

(54) CURRENT MODULATION OF DIRECT CURRENT TRANSMISSION LINES

(76) Inventor: Lionel O. Barthold, 10 Wood's Point La., Lake George, NY (US) 12845

(*) Notice: Subject to any disclaimer, the term of this patent is extended or adjusted under 35 U.S.C. 154(b) by 0 days.

(21) Appl. No.: 10/289,771

(22) Filed: Nov. 7, 2002

(51) Int. Cl.$^7$ ............... H02H 7/00; G05F 1/70
(52) U.S. Cl. ........................ 363/51; 323/207
(58) Field of Search ................. 323/205, 207, 323/907; 363/50, 51; 361/103

(56) References Cited

U.S. PATENT DOCUMENTS

| | | | | |
|---|---|---|---|---|
| 4,727,466 A | * | 2/1988 | Sakai | 363/35 |
| 5,420,495 A | * | 5/1995 | Hingorani | 323/218 |
| 5,952,816 A | * | 9/1999 | Larsen | 323/215 |
| 5,999,388 A | * | 12/1999 | Asplund | 361/58 |
| 6,255,806 B1 | * | 7/2001 | Seppanen et al. | 323/210 |
| 6,356,472 B1 | * | 3/2002 | Runkle et al. | 363/170 |
| 6,552,598 B2 | * | 4/2003 | Gelman | 327/453 |

\* cited by examiner

Primary Examiner—Adolf Berhane
(74) Attorney, Agent, or Firm—Brian M. Dingman, Esq.; Mirick, O'Connell, DeMallie & Lougee, LLP (57) ABSTRACT

A current-modulation method of transmitting high voltage direct current (HVDC) power over a transmission system comprising at least three conductors, wherein each conductor has a nominal thermal limit to its current-carrying capacity. The method involves transmitting DC current over at least one conductor at a level which can exceed each such conductor's nominal thermally-limited current-carrying capacity, returning the transmitted current over a quantity of conductors greater than the quantity used to transmit at the higher level, so that each return current is less than the transmitted current, and periodically switching the current level in the conductors so as to rotate the higher level current among at least two of the conductors, such that, over time, the resistance heating of the conductors does not exceed any conductors' thermal limit.

22 Claims, 6 Drawing Sheets

a. Conventional 2-Pole HVDC with emergency ground return b. Tri-Pole configuration to enable the invention.

CURRENT MODULATION OF DIRECT CURRENT TRANSMISSION LINES

FIELD OF THE INVENTION

This invention relates to current modulation of direct current transmission lines.

BACKGROUND OF THE INVENTION

In utility, industrial, commercial, marine, and military power systems Alternating Current (AC) supply lines have intrinsic limits to the amount of power they can transfer from source to load. That limit is proportional to both voltage and current, voltage being limited by the insulation provided, the current by the thermal limit of conductors. It is not unusual for power demand to outgrow either the capacity or the reliability limits of the transmission system already in place, both circumstances being addressed by the invention. While not limited to high voltage electric power transmission lines, the invention will be illustrated in that context.

Line loading on large AC power systems varies according to demand but seldom reaches the thermal maximum of the conductors. Actual transfer limits are more often set by characteristics of the electrical network of which a line is a part than by the thermal limitations of its conductors. Beyond a certain level of transfer; (1) synchronism of the AC system may be jeopardized (2) voltages may become depressed or unstable or (3) the inadvertent loss of the line in question could not be accommodated by other lines on the system. Furthermore the flow on an AC line cannot easily be controlled independent of flow on other lines in the system. For example when the thermal limit is reached on the weaker of two parallel AC lines, the stronger cannot be independently controlled to carry its maximum.

There are a number of AC equipment options, well described in the technical literature, that can overcome some or all of the system limitations to flow on a particular line. They include series compensation, phase shifting transformers, and other options, sometimes enhanced by thyrister controls. Such recourses, to the extent they are effective, are less expensive than construction of additional lines where that is even a practical option.

Present trends in many countries exacerbate the system-based limitations on AC line transfers, particularly those which interconnect major system segments. Growth in the ratio of intra-regional generating capacity to inter-regional transmission capacity may eventually threaten stable operation. Furthermore power brokering, now a common practice in the new generation market place is made difficult on AC systems since contracts must specify or infer a path over which the power is to flow even though it is difficult on an AC system to control the actual route of flow.

High Voltage Direct Current (HVDC) transmission overcomes many of the above limitations. It is possible, for example, to insert an AC/DC/AC (Back-to-Back) converter at one end of an AC line, thus operating the line at AC but gaining the power control advantages of DC. That option can usually bring the line's maximum loading up to the thermal limit of conductors, thus making full use of the line investment. However by leaving the line itself as an AC medium of transfer, back-to-back schemes forfeit the advantage HVDC has in its ability to make more efficient use of overhead or cable insulation. Insulation on AC systems is dimensioned to accommodate the peak of a sinusoidal voltage wave, even though the voltage is lower during other parts of the cycle. HVDC uses the insulation constantly and does not require as high an allowance for surges. The product of these two factors alone can boost transfer capacity by a factor from √2 to as much as 2, depending on insulation conditions.

In addition to improved transfer ability due to physical attributes of the line or cable, transfers on an HVDC lines have far fewer system-imposed limitations. Thus where there is a demand for more transfer, it is easier for an HVDC line to operate up to the thermal limits of the conductors. Being controllable, HVDC is also much more compatible with modern power brokering practices.

HVDC is inherently more reliable than AC, primarily because the loss of one conductor on an AC line forces the whole line out of service. Operation with two of three phases in service is not possible. Bipolar HVDC lines, equipped with metallic ground return, can loose one conductor and still operate at half power.

It is for the above reason that the industry contemplates conversion of selected existing AC lines to HVDC. The primary barrier to that recourse is economic. To convert an AC line to DC, all of the transmitted power must pass through an AC/DC inverter at one terminal and a DC/AC converter at the other. Thus even if the conversion achieves no increase in power level, the full cost of the conversion equipment must be justified by operational advantages of HVDC. On the other hand if system-imposed limitations allow the AC line to operate at only half its thermal limit and HVDC conversion allows loading to be brought to that limit, the conversion, while sized for full capacity, can be written off over the incremental one half of full capacity achieved.

In the case of some underground or underwater cables there are technical limits to HVDC conversion as well. Paper insulated cables are judged to be suitable for either AC or DC, thus delivering the advantages cited above. But cables with solid insulation, e.g. cross-linked polyethylene have two problems when used for DC. Over a period of time a static electrical charge builds up in the solid insulation which, upon reversal of power flow, achieved by most systems through a sudden reversal of polarity, can almost double the local electrical gradient in the insulation causing a risk of failure. Additionally, continuous DC systems applied to solid cable there is tendency for impurities to migrate in the insulation causing a weakened insulation path. Both problems are ameliorated this invention.

A double-circuit AC line, having two three-phase circuits on one structure (six conductor positions), is easily adapted to bipolar DC since it can be converted into three independent 2-pole circuits or into a single 2-pole circuit with three parallel conductors for each pole, thus making full use of the conductivity available.

The odd number of phase positions (3) on a single circuit AC line means that only two phase positions can be fully used, the third serving as an emergency ground should one normal pole be out of service. Thus whatever per-conductor advantages are achievable in the double circuit case, are penalized by a factor of ⅔ in the single circuit case Normally this would render the thermal limit of single circuit AC lines, converted to DC, about the same as the prior AC limit.

The same arguments apply to underground cables where, in the case of a single three-phase cable, one third of the inherent conductivity would be left unused under normal conditions.

SUMMARY OF THE INVENTION

Conductor "thermal limit" in the ensuing explanation is simplified as though it corresponded to a fixed ampere limit.

Actual temperature rise of bare conductors depends not only on conductor characteristics but a number of environmental factors including, ambient temperature, sun exposure, and the magnitude and direction of wind. Technical literature provides details of these effects for specific conductors and current levels. The effects of high conductor temperature which depend on the magnitude of current, its duration and the cumulative exposure time, include mechanical weakening and embrittlement. To simplify application, most transmission owners use very conservative assumptions and assign a single "thermal limit," in amperes, which is applied irrespective of actual conditions. Some assign two or more such values, each depending on conditions. Some actively monitor conditions and set the limits to correspond more closely to actual conditions. It will be apparent that any of the foregoing approaches would adapt equally well to implementation of the invention as they do to operation of the AC line.

Heating of a conductor is proportional to the square of current flowing through it and directly proportional to its electrical resistance. The electrical resistance of a particular conductor to DC current depends on the metal it uses, the configuration of conductor strands, and other design factors. When the same conductors is subject to an AC current, electric fields within the conductor tend to distort the internal current distribution, forcing more current to the outer edges, thus effectively reducing the useful conductor cross section. This ("skin effect") increases AC resistance. The AC/DC resistance ratio can range from roughly 1.01 to as much as 1.10 depending on conductor characteristics. Thus any given conductor can, for the same temperature rise, carry a higher DC than AC current.

The current carried by overhead conductors, and most electrical equipment must be limited to levels where the equilibrium between the heat generated by that current and heat loss from cooling leaves the component at a temperature which will not damage it. That requirement notwithstanding, the current through conductors or any other system component can exceed the maximum continuously sustainable level (termed herein the "nominal thermally limited current-carrying capacity") if (1) the component is already below its maximum temperature, (2) such excessive current is compensated for by periods of lower current and (3) the time constant of the variations in current is short compared to the thermal time-constant of the component effected. This, in fact, is the basis for root-mean-square current ratings of all AC equipment. The period of variation in heat generation (current squared) for 60 Hz systems is approximately 8 milliseconds—exceedingly short compared to thermal time constants of power system lines and equipment components. Recognizing that those time constants are measured in minutes (for most cables in tens of minutes), lines and equipment can sustain high and low variations in heat generation over time periods orders of magnitude greater than they see at 60 Hz operation.

The invention modulates current magnitudes so that (1) the current is assigned a high value for a period of time, then a low value for a period of time such that the average heating effect is the same as a constant current of intermediate value and (2) the higher value is rotated among conductors so as to distribute the heating effect equally among them, thus using all of their inherent thermal capability. The invention, as embodied in the context of a single circuit three-phase transmission line, would cause one (the "burdened") phase position to carry a higher than normal current, $i_b$, which may be in excess of the conductor's thermal limit while the return ("recovery") currents, $i_r$, whose sum is equal and opposite to $i_b$, return on the other two phase positions. This regime is continued for a time interval, T, after which a thyristor bridge configuration assigns another phase position the value $i_b$, likewise reassigning the recovery currents. Thus the net thermal burden on each phase position and its attendant terminal equipment is within limits assigned to both conductors and equipment components. In any given embodiment of the invention T may be assigned a value consistent with and shorter than the thermal time constant of the most sensitive component in the current path or to address other effects that continuous DC voltage has on equipment or the environment.

Figure 1:
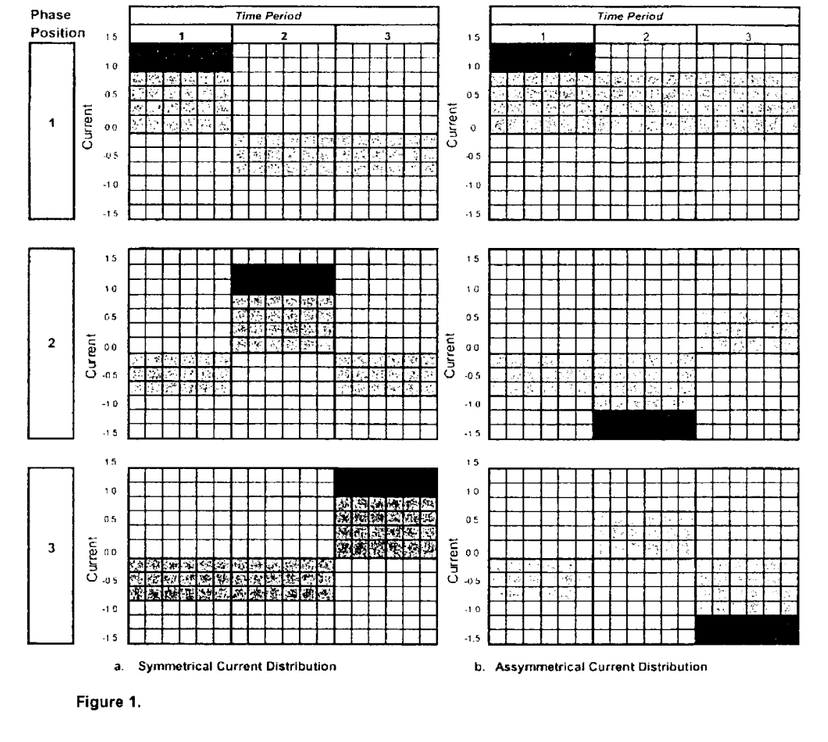
FIG. 1 shows two examples of current modulation, one symmetrical the other asymmetrical, as embodiments of the invention. Both are appropriate to a single-circuit three-phase AC transmission line converted to DC.

Examples of current modulation implementing this invention on a single circuit AC line converted to DC are illustrated in FIG. 1. FIG. 1a shows symmetrical modulation in which, again for purposes of illustration, $i_b$ is assigned a value of 1.5, and the two equal recovery currents, $i_r$, have values of −0.75. Thus the average DC current in each phase position is 1.0. FIG. 1b shows an example of asymmetrical modulation using the same respective values of $i_b$ and $i_r$, but in sequence such that phase position 1 is always positive. The invention is not limited to any particular modulation regime or to regimes where the time periods, 1, 2, and 3 are equal. It applies to any sequence of current system of current modulation where (1) the sum of transmitted and return currents is always zero and (2) the DC current overload burden rotates among one or more phases or wires, the others recovering thermally from their overload duty.

The modulations shown in FIG. 1 are shown as an abrupt transition from one current level to another. It is apparent that the transition can be ramped or softened to minimize harmonic generation or to reduce the stress on insulation or equipment. The change from positive to negative could, for example, emulate the positive to negative peak variation on a cycle of power frequency voltage.

The 1.5 value in the foregoing example, while useful in illustrating the principle introduced by the invention, is slightly optimistic since, in a practical case, the over-current, $i_b$ would have to be adjusted so that the average heating of the conductor would be the same as if the current were constant at a value of 1.0. That limit would require that average value of $i_b^2$ rather than $i_b$ over each of the three time intervals equal 1.0, the loss that would have occurred over those time intervals with normal current. Solving the equation:

$$[i_b^2 + 2\times(-i_b/2)^2]/3 = 1 \quad (1)$$

shows that ib would have to be equal to $\sqrt{2}$ or 1.414. Thus an over-current of 1.414 for one third of the time combined with a current of 0.707 for two thirds of the time would generate the same conductor heat as would a constant current of 1.

An example calculation will help illustrate the improvement the invention brings to reliability of a single-circuit AC line converted to DC. Assume that the AC line is operating at unity power factor so that the total AC power is equal to three times the product of phase-to-ground voltage $V_{l-g}$ and the phase current, $I_{AC}$, i.e.

$$P_{AC} = 3 \times V_{l-g} \times I_{AC} = 3pu \quad (2)$$

On conversion to DC the effective voltage could be increased by a factor, $k_v$, the product of $\sqrt{2}$ (the peak-to-rms ratio) and a factor which allows DC to use a somewhat higher voltage for the same insulation level based on DC's relatively milder demand for accommodation of over-voltage surges. For purposes of example, assume the second of those factors gives a 10% advantage so that:

$$V_{DC}=k_v \times V_{AC}=\sqrt{2}\times1.1=1.56 \tag{3}$$

Furthermore, the DC current could be increased to benefit from the resistance ratio, $R_{AC}/R_{DC}$, typically 1.03. Recalling that heat generation is proportionate to current squared:

$$I_{DC}/I_{AC}=\sqrt{R_{AC}/R_{DC}}\times1.015 \tag{4}$$

Thus for two-pole DC transmission the total power at the conductors' thermal limits would be:

$$P_{DC(2-pole)}=2\times1.56\times1.015=3.16 pu \tag{5}$$

Or, noting that the thermally limited AC power transfer was 3.0 pu, an increase about 5% over the AC case represented in equation (2).

If one were to achieve the same power per pole in the modulated case as characterized the 2-pole case, maximum current would have to be increased by a factor of 1.5 so that average power per pole would again be 1 pu. However as stated in equation (1), thermal limits require that the maximum current be √2 rather than 1.5 so that maximum power will be diminished proportionately. In that case:

$$P_{DC(modulated)}=(\sqrt{2}/1.5)\times3\times1.56\times1.015=4.46 \tag{6}$$

Or, in this case, almost 50% more than the AC limit described in equation (2)

Equation (6) illustrates the case where current modulation is used to achieve maximum power per pole. If the same total power is transmitted in the modulated case as would be in a bipolar case, then the ratio of losses in the modulated case to the bipolar case would be proportional to the sum of the squares of currents over a representative time period in the two cases or:

$$(1^2+\tfrac{1}{2}^2++\tfrac{1}{2}^2)/(1^2+1^2)=1.5/2=0.75 \tag{7}$$

Thus by dividing the return current between two return paths instead of one, the invention reduces losses, as a percent of power transmitted, by 25%.

The actual advantage of conversion to HVDC is usually much greater than indicated by equations (5) and (6). The latter imply that the AC line, prior to conversion, is already loaded to its thermal limit. System characteristics usually limit the loading of AC lines to well below that limit. Thus the advantages shown in equations (5) and (6) should be multiplied by the ratio of the AC thermally limited transfer to the system-limited transfer level. It is not unusual for that ratio to exceed 1.5.

The above data, normalized to set thermally limited AC power equal 1, is shown in Table 1. The table also shows the effect on each transfer limit of an outage of one phase position.

TABLE 1

Per Unit Thermal Limits of an example 3 phase line.

|  | AC | Converted to HVDC | | |
|---|---|---|---|---|
|  |  | Back-to Back | Bipole | Modulated TriPole |
| Normal | 1 | 1 | 1.05 | 1.49 |
| 1 Line Out | 0 | 0 | 0.53 | 1.05 |

Even with one phase position out of service the current modulated configuration transmits the same amount of power as the 2-pole configuration since the bridges would revert to 2-pole unmodulated system under those circumstances. Neither the original AC line nor the same line terminated in a back-to-back converter can transmit any power when one phase is out of service.

It is important to the understanding of the invention to realize that at all times the single circuit, thee conductor line is functioning as a 2-pole line with a split return path. Thus all of the converter and control technology developed over the history of modem HVDC is as applicable to lines using the invention as it is to lines built to operate as HVDC lines or converted from AC with other schemes for using the phase wires. Examples of the many systems capable of being accommodated by the invention include those described by U.S. Pat. Nos. 5,910,888 and 4941,079.

In a like sense, transmission lines which implement the invention, could function as continuous bipolar DC so long as the transfer demand can be satisfied with two active conductors, reverting to modulation only when the thermal capacity of the third conductor is needed.

The invention applies to underground or underwater cables as well as overhead lines. In the cable case the incentive for increasing loading is often higher since the investment in the transmission medium is greater and is correspondingly more expensive to augment. The technical limitations which prevent use of AC-designed solid insulation cable for traditional versions of DC are also overcome by the invention. By adjusting T to an appropriate value, (probably several minutes) and causing the transition from one polarity to another to be gradual, e.g. emulating a portion of a 50 Hz or 60 Hz sine wave, charge no more opportunity to build up than with AC energization, nor does the modulated voltage wave form provide the long-term constant voltage condition which causes migration of impurities.

At least two related benefits will accrue to overhead lines embodying the invention. On bipolar HVDC lines, ion clouds are generated by the constant DC potential. They have long been one of the environmental concerns associated with HVDC application. By alternating the reversals of polarity at relatively short intervals, a concomitant of current modulation, the invention will mitigate ion cloud generation in the same sense as do AC electric fields. More importantly, HVDC lines using existing transmission systems require additional insulation because constant DC fields surrounding the insulators attract particles from the air which eventually coat the insulator surface. The problem does not occur with AC since the field is constantly reversing. Even though it is a form of DC, the invention will lessen the accumulation of particles by periodic reversal of electric field, thus making it more likely that existing AC lines can be converted to DC without replacement of insulator strings.

The invention has been described as it pertains to large electric power systems. It will be apparent that the invention also applies to power delivery systems at any voltage level and frequency where (a) there is a need for greater power transfer using an existing multi-conductor medium and/or (b) the control advantages of direct current enhance operation of the system and/or (c) direct current, as a transmission medium has advantages, e.g. the absence of induced voltages in parallel circuits and/or (d) improved reliability is desired. With respect to the reliability advantage, it is apparent that the invention has two very desirable general characteristics.

1. It provides a high degree of redundancy by distributing the transmission burden over multiple conductors such that the loss of any one will have less impact on the total delivered power.

2. It constantly uses all conductors rather than holding some in reserve whose failure would not be detected until they were called on for service.

Thus it could be embodied in a system with an even number of conductors, e.g. a double circuit AC transmission line. In that case a simple two-pole conversion would require either that (1) one phase position be devoted to an emergency ground return, leaving only four useful conductors for DC transmission or that no emergency ground return be provided in which case an outage of one conductor would cause a third of the transfer capability to be lost. In the later case the invention would limit power the impact of power loss to one sixth rather than one third of the pre-outage total. It would also allow full utilization of one circuit, converted to DC, while the other remained at AC either as a staging strategy or in a case where both AC and DC ties were of value.

This invention features a current-modulation method of transmitting high voltage direct current (HVDC) power over a transmission system comprising at least three conductors, wherein each conductor has a nominal thermal limit to its current-carrying capacity, the method comprising transmitting DC current over at least one conductor at a high level which may exceed each such conductor's nominal thermally-limited current-carrying capacity, returning the transmitted current over a number of conductors greater than the number used to transmit at the higher level, so that each return current is less than the transmitted current, and periodically switching the current level in the conductors so as to rotate the high level current among at least two of the conductors, such that, over time, the resistance heating of the conductors does not exceed any conductors' thermal limits.

Preferably, for any conductor, the average of the square of each level of DC current multiplied by the time to which it carries that current is such as to ensure that the heating of that conductor does not exceed its thermal limits. The sum of currents in all conductors carrying the high current level is preferably equal and opposite to the sum of currents in conductors carrying the lower current level. The current flow in one or more conductors may be always in the same direction. The current flow in one or more of the return conductors may switch directions. In this case, the levels of higher current and lower current may be rotated among conductors such that the fraction of time which each conductor experiences each level of currents is such that no conductor is overheated. The current levels and the time during which each conductor is subjected to each current level may be such that no conductor's thermal limit is exceeded. The method may further comprise converting AC to DC before transmission, and converting DC to AC after transmission. This conversion may be accomplished using converter and inverter bridges of many configurations. The switching may be accomplished by control of the valves comprising those converters and inverters.

BRIEF DESCRIPTION OF THE DRAWINGS

For a better understanding of the nature and objects of the invention, reference should be made to the following detailed description taken in conjunction with the accompanying drawings in which.

EMBODIMENTS OF THE INVENTION

Figure 2:
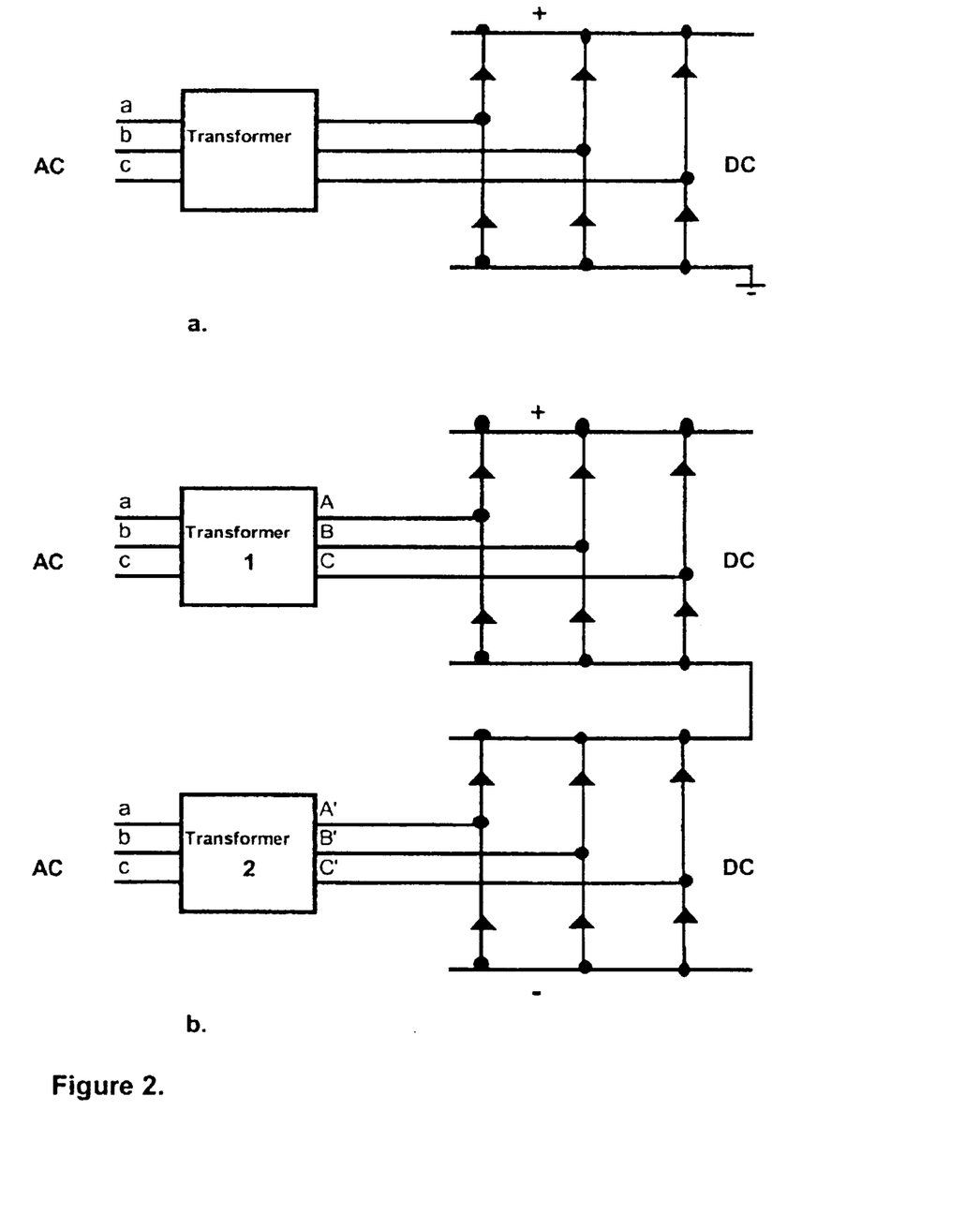
FIG. 2 (Prior Art) shows a fundamental Graetz thyristor bridge and its typical connection for bipolar twelve-pulse conversion of AC to DC.

The invention depends on methods of converting three-phase AC into DC, of controlling the magnitude of current in the DC path, and assigning the DC current and its return path to various conductors of a multi-conductor group. All of these technologies have been exhaustively discussed in the technical patent literature and are well known to those involved in the broad field of HVDC technology. On that basis the following explanation will deal principally with converter bridge configurations necessary to achieve current modulation, and the power rating of the thyristers or other valves comprising those bridges relative to bridges used for conventional bipolar HVDC systems. FIG. 2a shows a six pulse (Graetz) HVDC converter bridge for conversion of AC to DC. A similar bridge would be used to convert DC back to AC at a remote line terminal. Conversion from three phase AC to HVDC is achieved by causing each thyrister to begin conducting (commutating) at a time and polarity on the AC wave which causes currents to flow in the desired direction on the DC system. The resulting DC currents and voltage are rich in harmonics that are minimized by the use of special filters. The direction of power flow is reversed by changing the AC voltage polarity at which each thyrister is commutated; thereby causing the DC voltage to reverse while the current direction remains the same. Bridges of the type shown in FIG. 2a can be configured many ways. Two such bridges are normally connected in series as shown in FIG. 2b, the three-phase AC supply for one (A', B', C') displaced, through use of different transformer connections, 30 electrical degrees from the supply of the other (A, B, C). This "12-Pulse" connection reduces harmonic content and filter costs. The explanations which follow and the embodiments of the invention could be equally well applied with six or twelve-pulse bridges or any other configuration to convert AC into DC.

Throughout discussion of the invention the word "thyrister" is used to represent any form of electrical "valve" or controlled nonlinear conducting device and, in the case of power applications, is used to represent what would actually be groups of such devices in series and/or parallel. Embodiments of the invention will include both individual devices and groups of devices of this kind.

FIG. 3a redraws the bridge of FIG. 2b to show how two mono poles would normally be configured to provide constant positive and negative polarity to a two-conductor DC line, or to two phase positions of a single circuit AC line. In the latter case the third phase position is used as a ground return path only in emergencies. FIG. 3b shows a straight-forward extension of that technology to a "Tri-pole" bridge where a monopole supplies each of three conductors, 1, 2, and 3. That extension would serve no economic purpose other than in the context of the invention. Implementation of the invention with the tri-pole bridge of FIG. 3b is illustrated in the current flow diagrams of FIG. 4.

Figure 4:
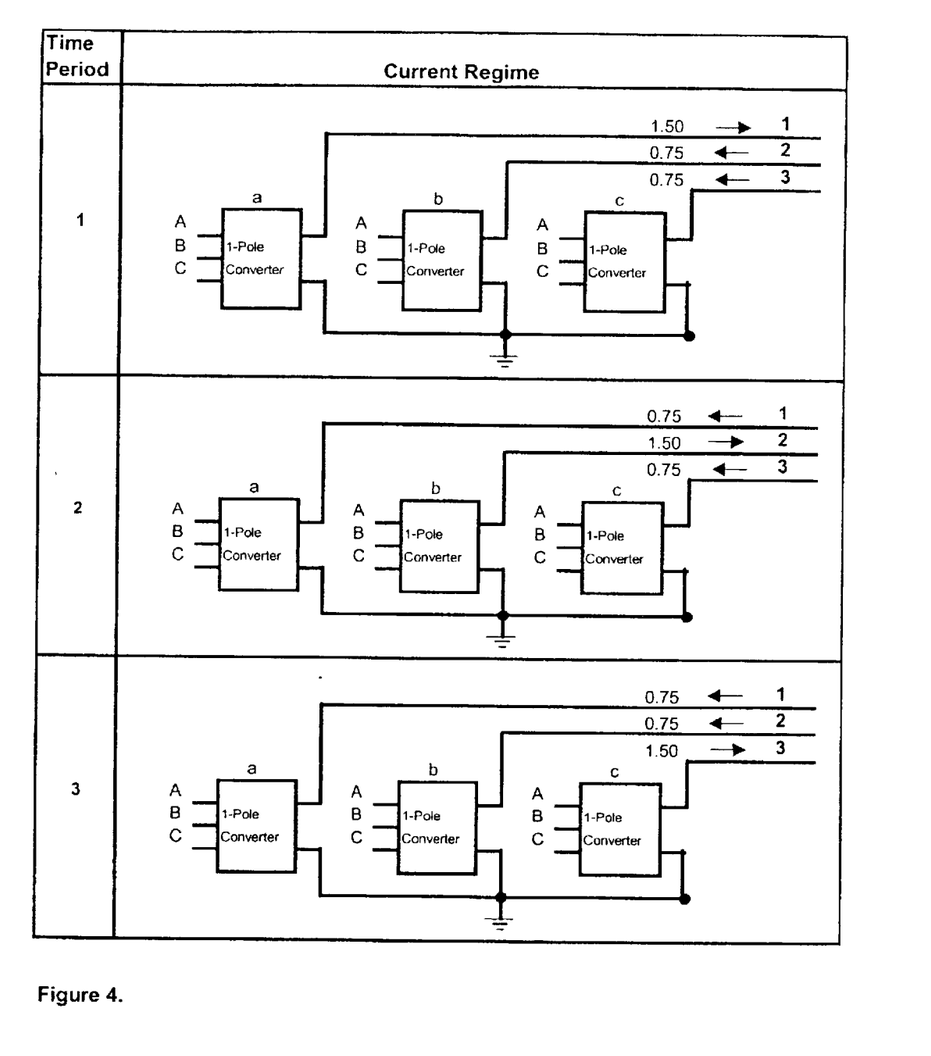
FIG. 4 shows an example inventive current modulation pattern of the tri-pole bridge on a three-phase transmission line, making full use of the thermal capacity of all conductors.
Figure 5:
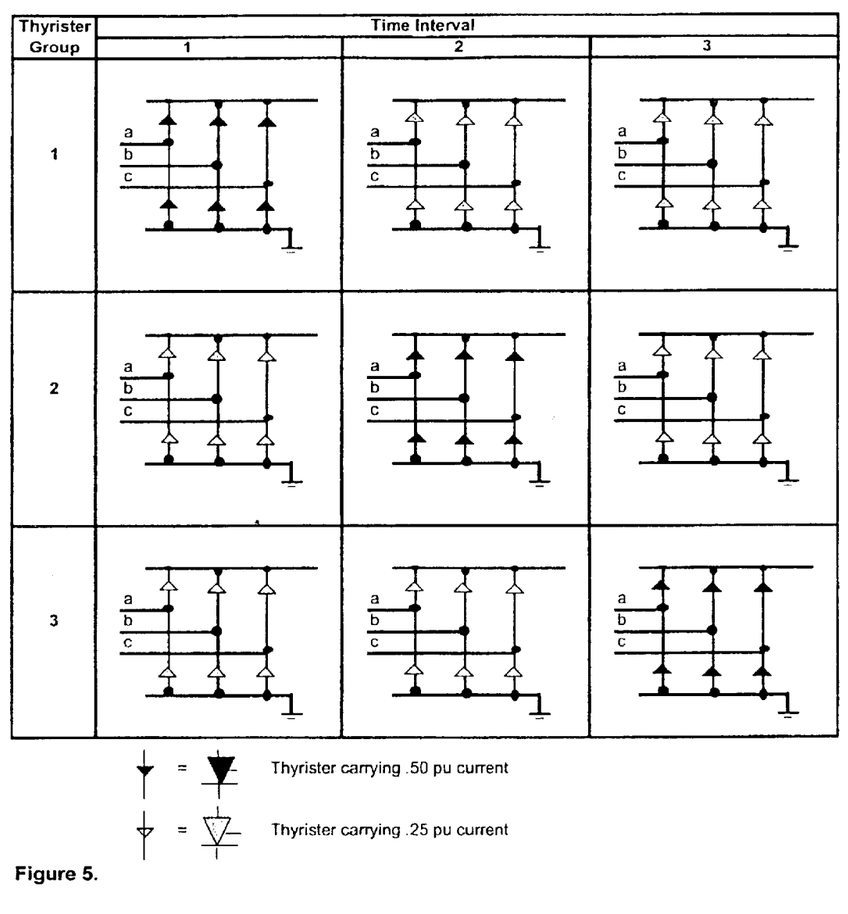
FIG. 5 shows the current distribution for each of three time intervals in each section of a tri-pole bridge comprised of six-pulse Graetz converters for symmetrical current modulation of the invention.

FIG. 4 shows the output current of each bridge modulated in accordance with symmetrical regime shown in figure 1a. To achieve the modulation inherent in this invention, the controls of each mono-pole bridge element would be coordinated to achieve either of the modulations illustrated in FIG. 1 or any other modulation which follows the principles disclosed by and constituting the invention.

Embodiments of current modulation need have no effect on the sum of individual thyrister ratings. That sum will be proportionate to the increase in power transfer achieved. This can be demonstrated by first referring to FIG. 2a, and assuming the tri-pole bridge is built from three units of the six-pulse bridge shown. Consider that the power achieved by one pole is 1.0 pu and its voltage is likewise 1 pu. Thus each thyrister, representing one half of the pole voltage and one-third the pole current, would be rated ⅙ pu power. On the same basis the aggregate thyrister rating for two such bridges connected for a bipolar system as in FIG. 2b, would be 2 pu.

Using the same rating convention, consider the loading of each thyrister, during each time interval in FIG. 1. The average loading of each thyrister in any one group is the same as in FIG. 2a, though in this case the result of alternative over-current and under-current duty. Should one phase position on the converted line be lost, modulation would be ceased and the remaining two phase positions would be used as a conventional bipolar line.

Figure 3:
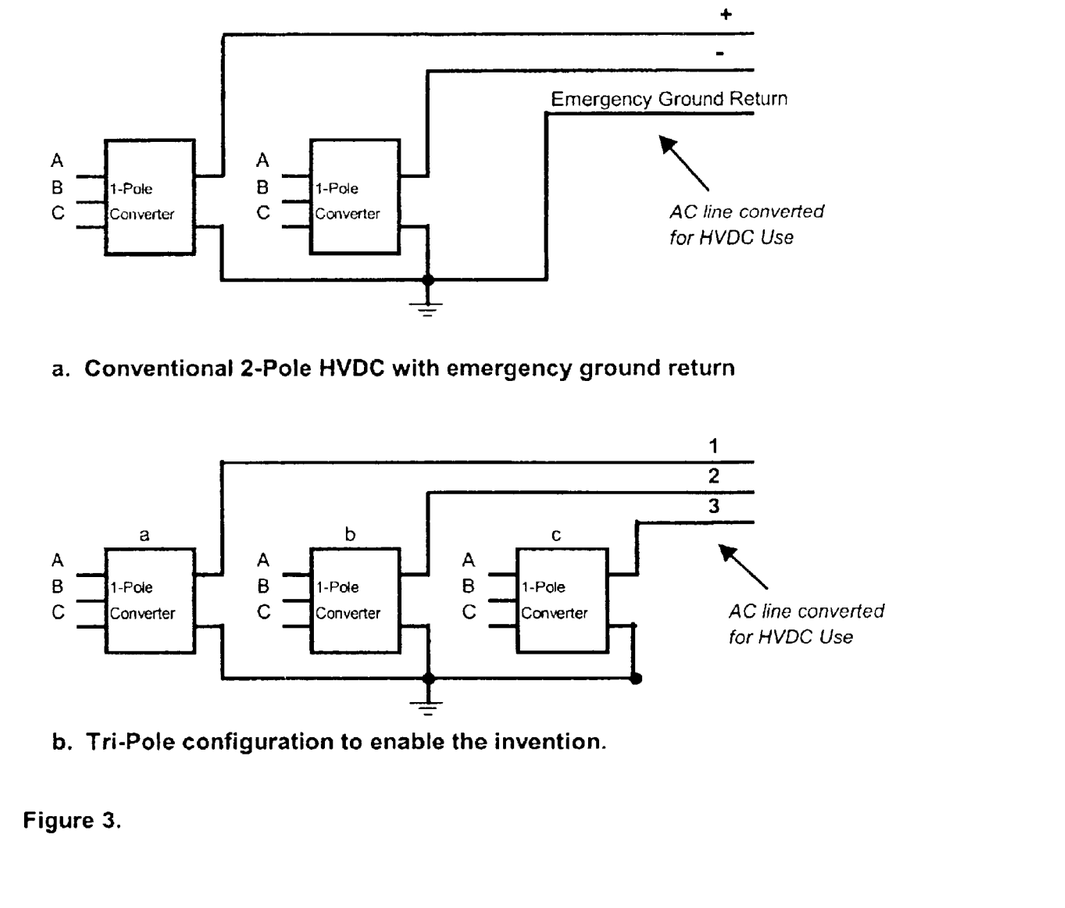
FIG. 3 shows a typical bipole bridge connected to a converted AC transmission line, the third phase position assigned as an emergency ground return. It also shows a simple reapplication of this technology to form a Tri-pole bridge to enable implementation of the invention.
Figure 6:
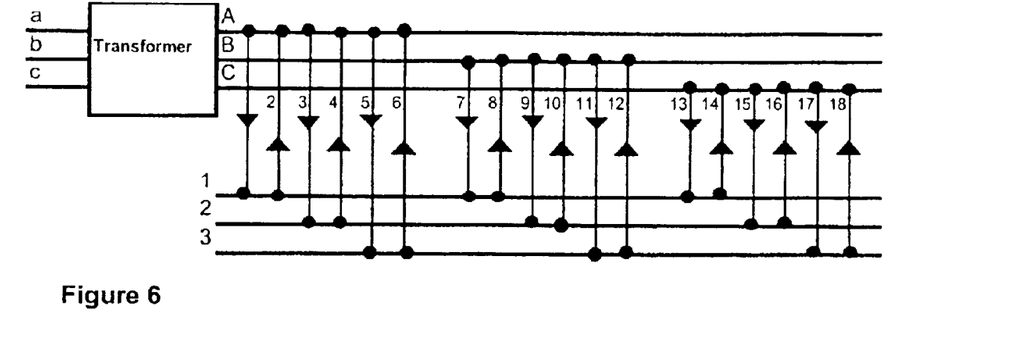
FIG. 6 illustrates an adaptation of a cyclo-converter bridge for an example embodiment of the invention.

Implementation of the invention, while most simply illustrated by the three monopole bridges shown in FIG. 3, can be implemented with other bridge configurations as well. FIG. 6, for example, shows the six-pulse Graetz Bridge of FIG. 2a in a more generalized form suitable for modulating currents according to this invention and applying them directly to the DC line. The configuration shown, similar in form to a cyclo-converter well known to frequency control applications, will allow any of three phase positions to conduct the burdened current, $i_b$, the recovery current, $i_b$, being equally shared by the other two. The resulting bridge is comprised of 18 thyristers, the same as used for the three individual 6-pulse mono-polar bridges represented in the former example. The bridge of FIG. 6 is equally capable of supplying any two conductors with the third conductor out of service.

The invention is not limited to the above-described embodiments which are currently perceived as the best mode of the invention and which only serve as a general explanation of the invention's principles. Within the scope of the invention, as defined in the claims, the current modulation regimes, switching principles, and other novelties described herein can also be realized with other embodiments that have not been described above. In particular, the benefits of the invention can result from a combination of the respective single features of the claims.

Values and reference numerals in the description serve illustration purposes to facilitate the understanding of the invention and do not limit the scope of the protection.

Although specific features of the invention are shown in some drawings and not others, this is for convenience only as some feature may be combined with any or all of the other features in accordance with the invention.

Other embodiments will occur to those skilled in the art and are within the following claims.

What is claimed is:

1. A current-modulation method of transmitting high voltage direct current (HVDC) power over a transmission system comprising three conductors, wherein each conductor has a nominal thermal limit to its current-carrying capacity, the method comprising:
   transmitting DC current over one conductor at a level which may be above the conductor's nominal thermally-limited current-carrying capacity;
   returning the transmitted current over the other two conductors, such that each return current is less than the transmitted current, wherein the total transmitted and return currents are nominally equal; and
   periodically switching the current level in the conductors so as to rotate the higher level current among the three conductors, such that, over time, losses are reduced and the resistance heating of the conductors does not exceed the conductors' thermal limits.

2. The HVDC current-modulation transmission method of claim 1 wherein each of the three conductors transmits current at the high level nominally for one-third of the time, and returns current at a lower level nominally for two-thirds of the time.

3. The HVDC current-modulation transmission method of claim 2 wherein the high current level is nominally two times that of the lower current level.

4. The HVDC current-modulation transmission method of claim 1 wherein the current flow in one conductor is always in the same direction.

5. The HVDC current-modulation transmission method of claim 4 wherein the current flow in the return conductors switches direction.

6. The HVDC current-modulation transmission method of claim 5 wherein the current in each of the return conductors conducts in the return direction, opposite to that of the transmitting conductor, nominally for two-thirds of the time.

7. The HVDC current-modulation transmission method of claim 1 wherein, for any conductor, the average of the square of each level of DC current multiplied by the time to which it carries that current is no more than that which would exceed the conductor's AC thermal limit.

8. The HVDC current-modulation transmission method of claim 1 further comprising converting AC to DC before transmission, and converting DC to AC after transmission.

9. The HVDC current-modulation transmission method of claim 8 wherein the conversion is accomplished using thyrister-based converters.

10. The HVDC current-modulation transmission method of claim 9 wherein the switching is accomplished by control of the thyrister-based converters.

11. The HVDC current-modulation transmission method of claim 1 wherein the switching is accomplished using thyrister-based converters.

12. A current-modulation method of transmitting high voltage direct current (HVDC) power over a transmission system comprising at least three conductors, wherein each conductor has a nominal thermal limit to its current-carrying capacity, the method comprising:
   transmitting DC current over at least one conductor at a level which may be above each such conductor's nominal thermally-limited current-carrying capacity;
   returning the transmitted current over a quantity of conductors greater than the quantity used to transmit at a higher level, such that each return current is less than the transmitted current; and
   periodically switching the current level in the conductors so as to rotate the higher level current among at least two of the conductors, such that, over time, losses are reduced and the resistance heating of the conductors does not exceed the conductors' thermal limits.

13. The HVDC current-modulation transmission method of claim 12 wherein, for any conductor, the average of the square of each level of DC current multiplied by the time to which it carries that current is such as to ensure that the heating of that conductor does not exceed its thermal limits.

14. The HVDC current-modulation transmission method of claim 13 wherein the sum of currents in all conductors carrying the high current level is equal and opposite to the sum of currents in conductors carrying the lower current level.

15. The HVDC current-modulation transmission method of claim 12 wherein the current flow in one or more conductors is always in the same direction.

16. The HVDC current-modulation transmission method of claim 15 wherein the current flow in one or more of the return conductors switches direction.

17. The HVDC current-modulation transmission method of claim 16 wherein the levels of higher current and lower current are rotated among conductors such that the fraction of time which each conductor experiences each level of currents is such that no conductor is overheated.

18. The HVDC current-modulation transmission method of claim 12 wherein current levels and the time during which each conductor is subjected to each level is such that no conductor's AC thermal limit is exceeded.

19. The HVDC current-modulation transmission method of claim 12 further comprising converting AC to DC before transmission, and converting DC to AC after transmission.

20. The HVDC current-modulation transmission method of claim 19 wherein the conversion is accomplished using thyrister-based converters.

21. The HVDC current-modulation transmission method of claim 20 wherein the switching is accomplished by control of the thyrister-based converters.

22. The HVDC current-modulation transmission method of claim 12 wherein the switching is accomplished using thyrister-based converters.

* * * * *